(12) United States Patent
Friedman

(10) Patent No.: US 7,707,146 B2
(45) Date of Patent: Apr. 27, 2010

(54) SYSTEM AND METHOD OF SEARCHING FOR PROVIDING CLUE-BASED CONTEXT SEARCHING

(75) Inventor: Nathaniel Dourif Friedman, Boston, MA (US)

(73) Assignee: Novell, Inc., Provo, UT (US)

( * ) Notice: Subject to any disclaimer, the term of this patent is extended or adjusted under 35 U.S.C. 154(b) by 223 days.

(21) Appl. No.: 11/366,616

(22) Filed: Mar. 3, 2006

(65) Prior Publication Data

US 2007/0033183 A1 Feb. 8, 2007

Related U.S. Application Data

(63) Continuation-in-part of application No. 11/229,628, filed on Sep. 20, 2005, and a continuation-in-part of application No. 11/195,754, filed on Aug. 3, 2005, now Pat. No. 7,184,939, and a continuation-in-part of application No. 11/195,731, filed on Aug. 3, 2005.

(60) Provisional application No. 60/706,009, filed on Aug. 8, 2005.

(51) Int. Cl.
*G06F 17/30* (2006.01)

(52) U.S. Cl. ....................................... 707/3

(58) Field of Classification Search .................. 707/2, 707/3, 4, 100, 102; 709/224, 203; 704/257
See application file for complete search history.

(56) References Cited

U.S. PATENT DOCUMENTS

| | | | |
|---|---|---|---|
| 4,897,782 A | 1/1990 | Bennett et al. | 364/200 |
| 5,287,504 A | 2/1994 | Carpenter et al. | 395/600 |
| 5,355,484 A | 10/1994 | Record et al. | 395/650 |
| 5,577,241 A * | 11/1996 | Spencer | 707/5 |
| 5,864,848 A | 1/1999 | Horvitz et al. | 707/6 |
| 6,081,750 A | 6/2000 | Hoffberg et al. | 700/17 |
| 6,272,455 B1 | 8/2001 | Hoshen et al. | 704/1 |
| 6,272,507 B1 | 8/2001 | Pirolli et al. | 707/513 |
| 6,349,137 B1 | 2/2002 | Hunt et al. | 379/265.06 |
| 6,400,996 B1 | 6/2002 | Hoffberg et al. | 700/83 |
| 6,421,737 B1 | 7/2002 | Stone et al. | 709/318 |
| 6,480,881 B1 | 11/2002 | Kubota et al. | 709/202 |
| 6,484,203 B1 | 11/2002 | Porras et al. | 709/224 |
| 6,611,877 B2 | 8/2003 | Korn et al. | 709/318 |
| 6,629,106 B1 | 9/2003 | Narayanaswamy et al. | 707/104.1 |
| 6,647,383 B1 * | 11/2003 | August et al. | 707/3 |
| 6,735,602 B2 | 5/2004 | Childress et al. | 707/200 |
| 6,775,665 B1 | 8/2004 | Piersol | 707/4 |

(Continued)

OTHER PUBLICATIONS

Corbet, "Watching Filesystem Events with Inotify", Sep. 29, 2004, available online: <http://lwn.net/Articles/104343/>, 5 pages.

(Continued)

*Primary Examiner*—Etienne P LeRoux
(74) *Attorney, Agent, or Firm*—Pillsbury Winthrop Shaw Pittman LLP

(57) ABSTRACT

The invention is directed to a system and method of reordering conventional search results provided by a remote search engine such as Google. The invention may leverage a chronological timeline of user action information to infer relationships between objects in a search result. The search result reordering process may be iterative and does not require direct interaction by the user.

20 Claims, 8 Drawing Sheets

U.S. PATENT DOCUMENTS

| | | | |
|---|---|---|---|
| 6,931,593 B1* | 8/2005 | Grooters | 715/717 |
| 6,996,778 B2 | 2/2006 | Rajarajan et al. | 715/734 |
| 7,146,416 B1 | 12/2006 | Yoo et al. | 709/224 |
| 7,155,514 B1 | 12/2006 | Milford | 709/225 |
| 7,188,317 B1 | 3/2007 | Hazel | 715/804 |
| 7,213,040 B1 | 5/2007 | Stokes et al. | 707/203 |
| 7,437,358 B2 | 10/2008 | Arrouye et al. | 707/4 |
| 7,526,478 B2 | 4/2009 | Friedman | 707/6 |
| 7,539,673 B2 | 5/2009 | Trowbridge | 707/3 |
| 7,552,445 B2 | 6/2009 | Green | 719/318 |
| 2002/0068558 A1* | 6/2002 | Janik | 455/422 |
| 2002/0069059 A1* | 6/2002 | Smith | 704/257 |
| 2002/0087649 A1 | 7/2002 | Horvitz | 709/207 |
| 2002/0143860 A1* | 10/2002 | Catan | 709/203 |
| 2002/0147805 A1 | 10/2002 | Leshem et al. | 709/223 |
| 2002/0174134 A1 | 11/2002 | Goykhman | 707/104.1 |
| 2003/0018634 A1 | 1/2003 | Shringeri et al. | 707/4 |
| 2003/0099399 A1 | 5/2003 | Zelinski | 382/186 |
| 2004/0030753 A1 | 2/2004 | Horvitz | 709/206 |
| 2004/0049494 A1* | 3/2004 | Kottisa | 707/3 |
| 2004/0049512 A1* | 3/2004 | Kawakita | 707/100 |
| 2004/0117802 A1 | 6/2004 | Green | 719/318 |
| 2005/0114374 A1* | 5/2005 | Juszkiewicz et al. | 707/101 |
| 2005/0188174 A1 | 8/2005 | Guzak et al. | 711/203 |
| 2006/0010120 A1* | 1/2006 | Deguchi et al. | 707/4 |
| 2006/0031199 A1 | 2/2006 | Newbold et al. | 707/3 |
| 2006/0156246 A1 | 7/2006 | Williams et al. | 715/764 |
| 2006/0178898 A1 | 8/2006 | Habibi | 705/1 |
| 2006/0221235 A1* | 10/2006 | Kusumoto | 348/553 |
| 2006/0224938 A1 | 10/2006 | Fikes et al. | 715/500 |
| 2007/0033220 A1 | 2/2007 | Drucker et al. | 707/103 R |
| 2007/0039049 A1 | 2/2007 | Kupferman et al. | 726/22 |
| 2007/0094292 A1* | 4/2007 | Kataoka | 707/102 |

OTHER PUBLICATIONS

Microsoft, Outlook 2003 Screenshots, Copyright 2003, 9 pages.
Otto Bruggeman, [PATCH] kdirwatch.cpp, Sep. 21, 2002, kde-core-devel list http://lists.kde.org/?l=kde-core-devel&m=103265283012353&w=2, 2 pages.
Josef Weidendorfer, Re:[PATCH] kdirwatch.cpp, Sep. 23, 2002, kde-core-devel list http://lists.kde.org/?l=kde-core-devel&m=103279747704133&w=2, 1 page.
Sven Radej, "class KDirWatch", 2003, <http://api.kde.org/3.1-api/classref/kio/KDirWatch.html>.
Microsoft Corporation, "How to Use the Event Logging Utility (Logevent.exe) to Create and Log Custom Events in Event Viewer in Windows 2000", Article 0315410, Jul. 15, 2004, 3 pages.
Adiscon GmbH, "MonitorWare Agent 3.0", software documented publicly released Apr. 4, 2005, 224 pages.
Adiscon GmbH, "MonitorWare Console 3.0", software documented publicly released Oct. 14, 2006, 124 pages.
Adiscon GmbH, "MonitorWare Console Sample System Status Report", 2003, 10 pages.

* cited by examiner

SYSTEM AND METHOD OF SEARCHING FOR PROVIDING CLUE-BASED CONTEXT SEARCHING

CROSS-REFERENCE TO RELATED APPLICATIONS

This application claims the benefit of U.S. Provisional Patent Application Ser. No. 60/706,009, entitled "System and Method of Analyzing a Timeline and Performing Search Functions," filed Aug. 8, 2005, the contents of which are hereby incorporated by reference in their entirety. In addition, this application is a continuation-in-part of U.S. patent application Ser. No. 11/195,754, entitled "System and Method of Implementing User Action Monitoring to Automatically Populate Object Launchers," which issued as U.S. Pat. No. 7,184,939 on Feb. 27, 2007, U.S. patent application Ser. No. 11/195,731, entitled "System and Method of Searching for Information Based on Prior User Actions," which issued as U.S. Pat. No. 7,502,798 on Mar. 10, 2009, and U.S. patent application Ser. No. 11/229,628, entitled "System and Method of Associating Objects in Search Results," which issued as U.S. Pat. No. 7,440,948 on Oct. 21, 2008, the contents of which are hereby further incorporated by reference in their entirety.

FIELD OF THE INVENTION

This invention relates to a system and method of providing clue-based context searching with voice recognition capabilities and/or with integrated information from a public broadcast system.

BACKGROUND INFORMATION

During the course of a computer session, many actions may be performed on a computer. For several reasons, including increasing workforce productivity, it may be desirable to monitor these actions. Known applications enable monitoring of actions performed on the computer through logging of events, such as keystrokes, web sites visited, emails sent/received, windows viewed, and passwords entered. Known applications further enable capturing of screen shots at scheduled time intervals. Known event monitoring applications are typically run in stealth mode to make them undetectable to users of the monitored computer.

Other known applications enable monitoring of actions performed on the computer through direct monitoring of select types of object-level actions performed using a single application or through direct monitoring of select types of object-level actions performed in a suite of associated applications. Once the select types of object-level actions are logged, they may be displayed.

While known applications present logged events and/or selected types of object-level actions, known applications are deficient at least because they do not monitor and log all types of object-level actions performed across multiple unrelated applications. Additionally, known applications are deficient because they do not identify relationships between the events and/or selected types of object-level actions. For example, known applications do not analyze information associated with each event and/or selected type of object-level action to infer relationships between two or more events and/or two or more objects. Furthermore, known applications are deficient because they do not enable searching for events and/or objects based on the observed actions.

Other drawbacks exist with these and other known applications.

SUMMARY

Various aspects of the invention overcome at least some of these and other drawbacks of known applications. According to one embodiment of the invention, a system is provided that includes at least one client terminal having a processor, a memory, a display and at least one input mechanism (e.g., keyboard or other input mechanism). The client terminal may be connected or connectable to other client terminals via wired, wireless, and/or a combination of wired and wireless connections and/or to servers via wired, wireless, and/or a combination of wired and wireless connections.

Each client terminal preferably includes, or may be modified to include, monitoring software described herein that operates in the background to observe all types of actions performed on the corresponding client terminal. The actions may be associated with objects, including applications, documents, files, email messages, chat sessions, web sites, address book entries, calendar entries or other objects. Objects may include information such as personal information, user data and other information. Other applications may reside on the client terminal as desired.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to another embodiment of the invention, computer initiated actions may be tracked using triggering events. The type of information that corresponds to computer initiated actions may include, for example, when objects are automatically opened and/or closed, when the screen saver is activated, when an auto save is activated, and other computer initiated action information.

The information corresponding to user initiated actions and computer initiated actions may be displayed according to various configurations. For example, information corresponding to user initiated actions and computer initiated actions may be organized and displayed in a timeline. In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. According to one embodiment of the invention, information corresponding to the user initiated actions and/or the computer initiated actions may be presented as graphical information through screenshots, charts, and/or other graphical information. According to another embodiment of the invention, information corresponding to the user initiated actions and/or the computer initiated actions may be displayed in a linear format, non-linear format or other format.

According to one embodiment of the invention, a correlation determining system is provided that analyzes information associated with the user initiated actions that relate to these objects. Relationships may be inferred between objects based on a chronological proximity of user initiated actions, a chronological proximity of window focus toggling, or other information. Once relationships are discovered between two or more objects, the strength of the relationships may be determined using a relevance ranking that is based on a variety of factors associated with the user initiated actions and the computer initiated actions. A relationship between objects may be identified if the strength of the relationship is determined to exceed a predefined threshold value.

These and other objects, features, and advantages of the invention will be apparent through the detailed description of the embodiments and the drawings attached hereto. It is also to be understood that both the foregoing general description and the following detailed description are exemplary and not restrictive of the scope of the invention. Numerous other objects, features, and advantages of the invention should now become apparent upon a reading of the following detailed description when taken in conjunction with the accompanying drawings, a brief description of which is included below. Where applicable, same features will be identified with the same reference numbers throughout the various drawings.

DETAILED DESCRIPTION

Figure 1:
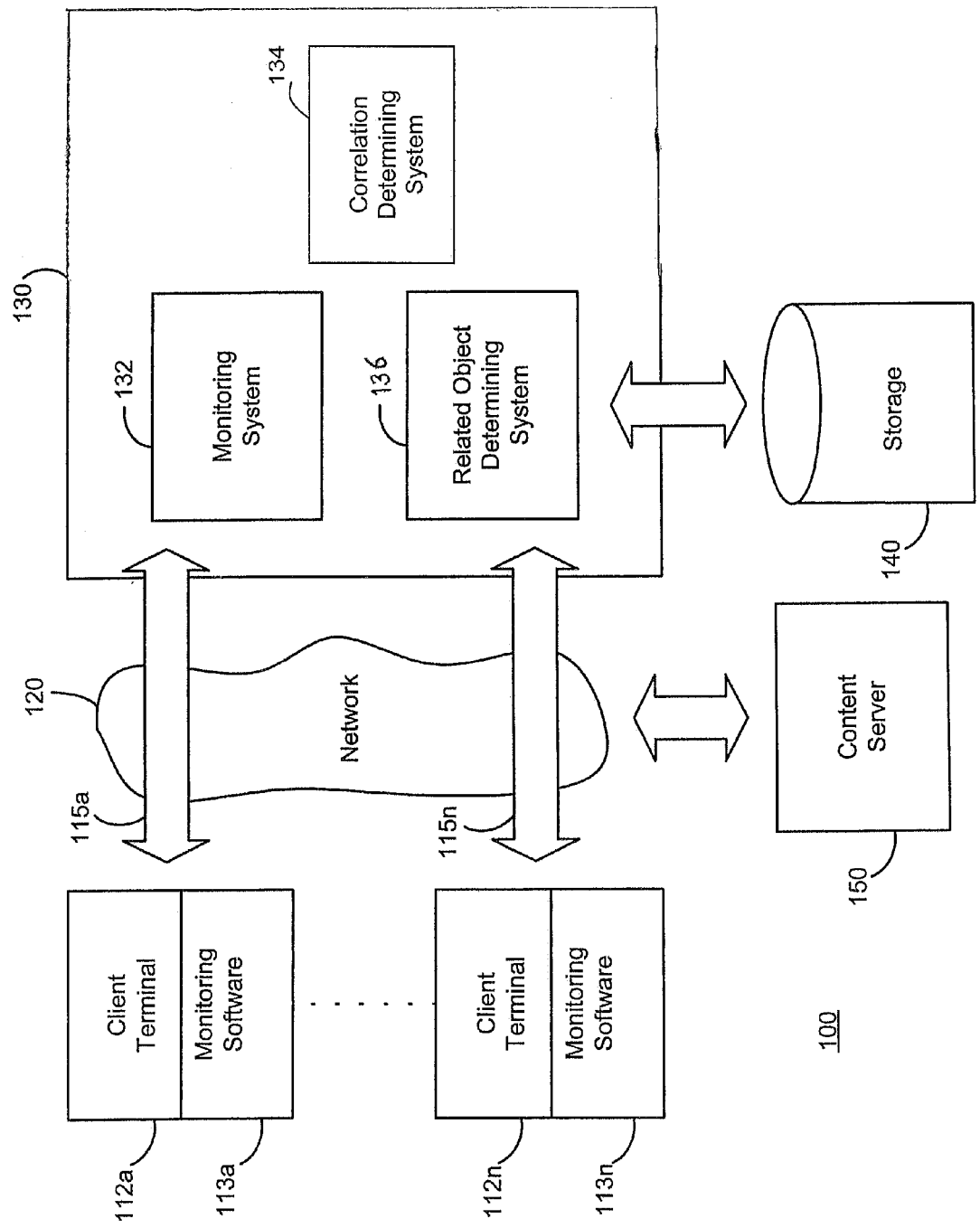
FIG. 1 illustrates an exemplary embodiment of a system diagram according to an embodiment of the invention.

FIG. 1 illustrates an example of the system architecture 100 according to one embodiment of the invention. Client terminals 112a-112n (hereinafter identified collectively as 112) and server(s) 130 may be connected via a wired network, a wireless network, a combination of the foregoing and/or other network(s) (for example the Internet) 120. The system of FIG. 1 is provided for illustrative purposes only and should not be considered a limitation of the invention. Other configurations may be used.

The client terminals 112 may include any number of terminal devices including, for example, personal computers, laptops, PDAs, cell phones, Web TV systems, devices that combine the functionality of one or more of the foregoing or other terminal devices, and various other client terminal devices capable of performing the functions specified herein. According to one embodiment of the invention, users may be assigned to one or more client terminals.

According to one embodiment of the invention, communications may be directed between one client terminal 112 and another client terminal 112 via network 120, such as the Internet. Client terminals 112 may communicate via communications media 115a-115n (hereinafter identified collectively as 115), such as, for example, any wired and/or wireless media. Communications between respective client terminals 112 may occur substantially in real-time if the client terminals 112 are operating online.

According to another embodiment of the invention, communications may be directed between client terminals 112 and content server(s) 150 via network 120, such as the Internet. Client terminals 112 may communicate via communications media 115, such as, for example, any wired and/or wireless media. Communications between client terminals 112 and the content server 150 may occur substantially in real-time if the devices are operating online. One of ordinary skill in the art will appreciate that communications may be conducted in various ways and among other devices.

Communications via network 120, such as the Internet, may be implemented using current and future language conventions and/or current and future communications protocols that are generally accepted and used for generating and/or transmitting messages over the network 120. Language conventions may include Hypertext Markup Language ("HTML"), extensible Markup Language ("XML") and other language conventions. Communications protocols may include, Hypertext Transfer Protocol ("HTTP"), TCP/IP, SSL/TLS, FTP, GOPHER, and/or other protocols.

According to one embodiment of the invention, client terminals 112 may include, or be modified to include, corresponding monitoring software 113a-113n (hereinafter identified collectively as 113) that may operate in the background to observe all types of actions performed on the corresponding client terminal 112. The types of actions performed on the corresponding client terminal 112 may be monitored for any applications accessed through the client terminal. The actions may be associated with objects, including applications, documents, files, email messages, chat sessions, web sites, address book entries, calendar entries or other objects. The objects may include information such as personal information, user data, or other information. According to one embodiment of the invention, monitoring software 113 may include client-side monitoring software. According to another embodiment of the invention, monitoring software 113 may include server-side monitoring software, such as monitoring system 132 that resides on server 130. Agents may be placed on the client terminal 112 to communicate information between monitoring system 132 and the client terminal 112. One of ordinary skill in the art will appreciate that other configurations may be available for deploying the monitoring software 113.

The actions performed during the computer session may be initiated by users and/or computers. Regarding user initiated actions, users may directly or indirectly access several types of objects during the course of the computer session. According to one embodiment of the invention, users may perform actions through a graphical user interface (GUI) or other interface. According to one embodiment of the invention, user initiated actions may be tracked using triggering events, including application level activity, user actions performed on objects, a user's activity focus, and/or other triggering events. According to another embodiment of the invention, user initiated actions may be tracked at any level including, for example, the window level and/or other levels. The type of information that corresponds to user initiated actions may include, for example, when objects are opened and closed, when users switch focus between different objects and/or windows, idle times, when users type on a keyboard, when users manipulate a mouse, and/or other user initiated action information.

Regarding computer initiated actions, computers may directly or indirectly access several types of objects during the course of the computer session. According to one embodiment of the invention, computers may perform actions including generating a reminder, activating a screen saver, initiating an auto save, automatically downloading information from a web site (such as an update file), and performing other computer initiated actions. According to one embodiment of the invention, computer initiated actions may be tracked using triggering events including, for example, launching of a screen saver, initiating an auto save, and/or other triggering events. The type of information that corresponds to computer initiated actions may include, for example, when objects are automatically opened and/or closed, when the screen saver is activated, when an auto save is activated, and other computer initiated action information.

According to one embodiment of the invention, the monitoring software 113 may operate undetected by the user. For example, the monitoring software 113 may be transparent to the user and may not appear in the windows task manager, in the registry, startup utilities, and/or other visible locations. In another embodiment of the invention, the monitoring software 113 may operate undetected by the user, but the results may be viewed on demand by users. In yet another embodiment of the invention, the monitoring software 113 may operate with user awareness. One of ordinary skill in the art will readily appreciate that other implementations may be used to monitor and/or view results associated with the observed actions.

According to another embodiment of the invention, the monitoring software 113 may gather information associated with the observed user initiated actions and/or computer initiated actions according to several techniques. In one embodiment of the invention, the information may be gathered using direct observation. For example, the information may be gathered by directly observing a window-based system for tracking information including, for example, tracking when windows appear and/or disappear from the graphical user interface, tracking which window on the GUI is focused, and other tracking information. In another embodiment of the invention, the information may be gathered by directly observing the windows-based system and mapping windows back to the associated applications, among other mapping information. In yet another embodiment of the invention, the information may be gathered by directly observing the windows-based system to monitor when the client terminal is actively being used or sitting idle, among other status information.

In an alternative embodiment of the invention, the monitoring software 113 may operate in a mode that gathers information associated with the observed user initiated actions and/or computer initiated actions by configuring other applications to broadcast action information. According to one exemplary embodiment of the invention, the monitoring software 113 may configure a browser application or other application to generate and send messages, such as a time-stamped message or other identifying messages, that inform the monitoring software 113 of the action being implemented by the browser such as, for example, "opening a website in window 12345," among other actions. One of ordinary skill in the art will readily appreciate that other techniques may be used to gather information associated with the observed user initiated actions and/or computer initiated actions.

According to one embodiment of the invention, information corresponding to user initiated actions and computer initiated actions may be processed in real-time or may be stored for subsequent processing. Storage 140, or other storage device, may be used to store the user initiated actions and computer initiated actions, among other data.

According to another embodiment of the invention, separate applications may be used to monitor and organize the gathered information. For example, a first application may be used to gather information according to one or more of the direct observation monitoring technique, the application configuration monitoring technique and other monitoring techniques. A second application may be used to organize the information associated with all of the observed types of actions including, for example, collating and chronologically organizing records of the observed actions, generating any user-defined listing of information corresponding to the observed actions, or applying any other organizing techniques. The separate applications may be embodied in the monitoring software 113, the monitoring system 132, or a combination thereof, among other configurations. One of ordinary skill in the art will readily appreciate that several configurations may be used to monitor and/or organize information associated with all the observed types of actions.

According to another embodiment of the invention, a single application may be used to monitor and organize the gathered information. For example, a single application may include both an observer component that gathers information corresponding to actions that are performed on a computer and an information organizing component, among other components. For example, the single application may be configured to observe and organize user initiated actions associated with objects including, for example, opening/closing objects, switching between objects/windows, and other user initiated actions. The single application may also observe and organize computer initiated actions including, for example, generating a reminder, creating new windows, activating a screen saver, initiating idle time, generating focus-level information, generating application-level information (i.e., opening an application and closing it), and/or other computer initiated actions. The single application may be embodied in the monitoring software 113, the monitoring system 132, or a combination thereof, among other configurations.

Figure 2:
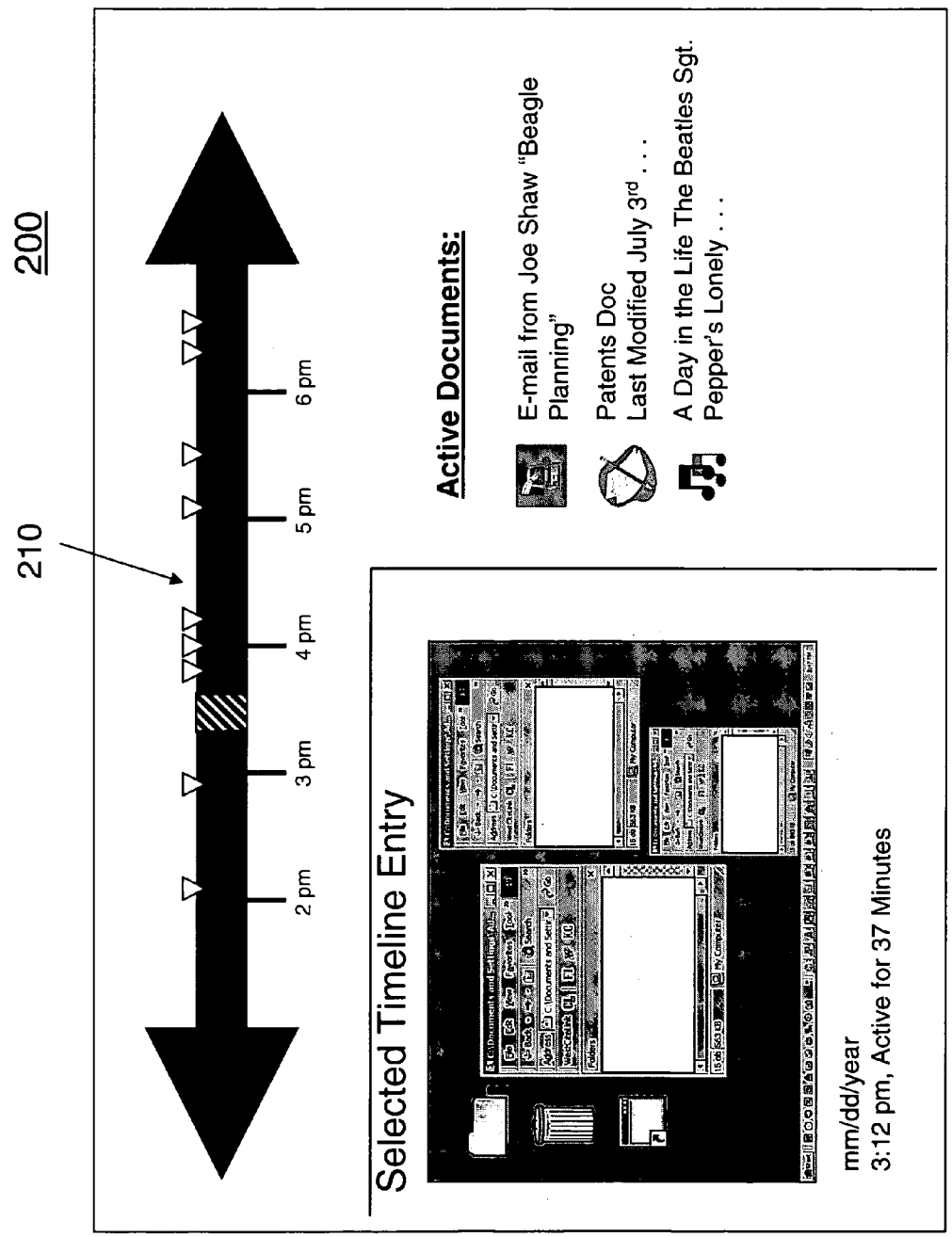
FIG. 2 illustrates an exemplary embodiment of a timeline according to an embodiment of the invention.

The information corresponding to user initiated actions and computer initiated actions may be displayed according to various configurations. As illustrated in FIG. 2, information corresponding to user initiated actions and computer initiated actions may be organized and displayed in a timeline 210. For example, timeline 210 may be arranged to include object entries that are organized in chronological time order. Display 200 may include a display portion 220 that illustrates the content of object entries, wherein the content may include information such as, screenshots, dates that objects are accessed, times that objects are accessed, lengths of time that objects are active, and/or other information. Display 200 may also include a portion 230 that lists active objects. In another embodiment of the invention, information may be organized and displayed according to other configurations.

In one embodiment of the invention, user initiated action information and computer initiated action information may be combined and displayed integrally in a timeline according to user defined configurations. In another embodiment of the invention, user initiated action information and computer initiated action information may be displayed separately according to user defined configurations. Regarding the separate display of user initiated action information and computer initiated action information, a first timeline may be provided that displays user initiated actions according to a first user defined configuration. A second timeline may be provided that displays computer initiated actions according to a second user defined configuration. According to another embodiment of the invention, information corresponding to the user initiated actions and/or the computer initiated actions may be displayed in a non-linear format or other format. One of ordinary skill in the art will appreciate that various configurations may be provided for organizing and/or displaying the information corresponding to the user initiated actions and the computer initiated actions.

According to one embodiment of the invention, information corresponding to the user initiated actions and/or the computer initiated actions may be presented as graphical information through screenshots, charts, and/or other graphical information. Graphical information may be associated with objects and may be displayed with corresponding objects. The graphical information may be captured using triggering events associated with the user initiated actions and/or computer initiated actions, including application level changes, active window title bars changes, window focus changes, and/or other triggering events. In one exemplary embodiment of the invention, the graphical information may include a screenshot that captures GUI content as presented to the user.

According to one embodiment of the invention, users may be assigned to several client terminals 112. Thus, one or more monitoring applications 113 may be associated with users. According to another embodiment of the invention, a roaming monitoring application may be assigned to users that enables one monitoring application to operate on several client devices. The timeline associated with a selected user may include an aggregate timeline that organizes and displays information provided from one or more client terminals 112 that are associated with the selected user. Alternatively, several timelines may be associated with the selected user and may be separately displayed. One of ordinary skill in the art will readily appreciate that other techniques may be used to monitor and/or view results associated with one or more client terminals.

Figure 3A:
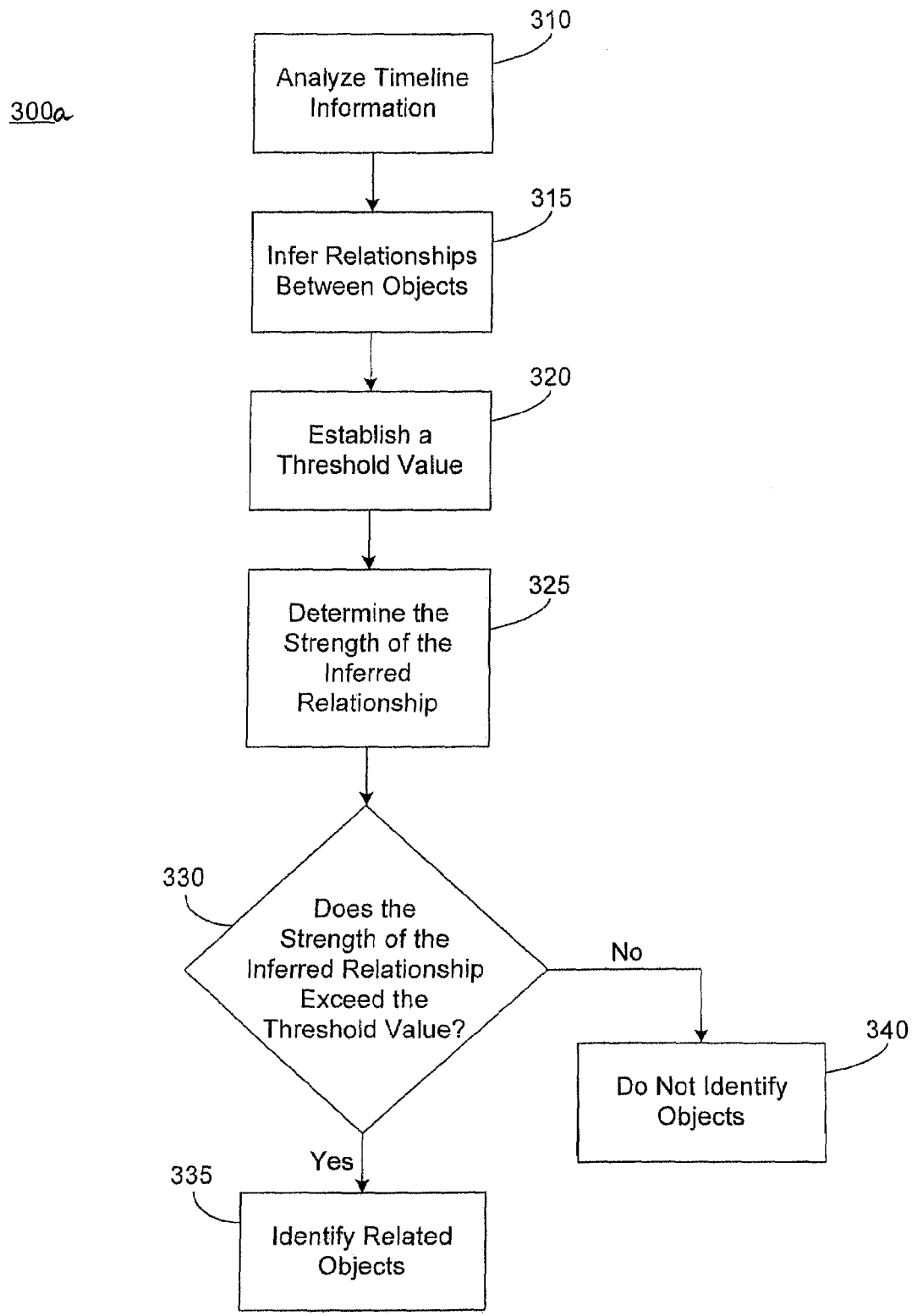
FIG. 3a illustrates a flow chart schematic for determining whether relationships exist between objects according to an embodiment of the invention.

According to another embodiment of the invention, information corresponding to user initiated and computer initiated actions may be analyzed by correlation determining system 134. FIG. 3a illustrates a flow diagram 300a of a generalized method for determining whether relationships exist between objects. In operation 310, timeline information is analyzed. For example, timeline information may be analyzed to discover that a first object (i.e., an email message) was opened, followed by the opening of a second object (i.e., a word processing application), followed by the opening and modification of a third object (i.e., a word processing document). According to another embodiment of the invention, correlation determining system 134 may analyze parameters derived from information associated with the user initiated actions relating to these objects including, for example, a temporal order in which the objects are accessed, focus toggling between the first object and the third object, opening the first object contemporaneously with the third object, or other user initiated actions, to infer relationships between objects. One of ordinary skill in the art will readily appreciate that other techniques may be used to infer relationships between objects.

In operation 315, relationships may be inferred between objects based on a chronological proximity of user initiated actions, a chronological proximity of window focus toggling, or other time-based information. Other types of information may be analyzed to infer relationships between objects. One of ordinary skill in the art will readily appreciate that relationships between objects may be inferred by analyzing one or more different parameters derived from common information that corresponds to user initiated actions and/or computer initiated actions.

According to an alternative embodiment of the invention, information corresponding to user initiated actions including, for example, a temporal proximity in which users access two or more objects, a temporal proximity in which users create two or more objects, a temporal proximity in which users edit two or more objects, operations that users conduct in close time proximity, or other information corresponding to user initiated action information, may be used to infer relationships between two or more objects. According to yet another embodiment of the invention, various known statistical methods may be used to infer relationships between two or more objects.

In operation 320, a threshold value may be established. Once relationships are discovered between two or more objects, the strength of the relationships may be determined in operation 325 using a relevance ranking that is based on a variety of factors associated with the user initiated actions and the computer initiated actions. According to one embodiment of the invention, the relevance may be provided with a value based on factors including, for example, a frequency of the user initiated actions, simultaneous/sequential occurrence of user initiated action, a duration of user initiated actions, overall chronological proximity of user initiated actions, and/or other factors.

In operation 330, the strength of the relationships derived from the factors may be compared to the threshold value. In operation 335, relationships between objects may be identified if the strength of the relationship is determined to exceed a predefined threshold value. Alternatively, in step 340, relationships between objects may not be identified if the strength of the relationship is determined to be below a predefined threshold value. One of ordinary skill in the art will readily appreciate that other techniques may be used to determine the strength of relationships between objects. According to another embodiment of the invention, correlation determining system 134 may analyze parameters derived from information associated with user initiated actions and/or computer initiated actions to discover relationships between objects.

According to one embodiment of the invention, correlation determining system 134 may analyze parameters derived from information associated with user initiated actions and/or computer initiated actions to discover relationships between objects. Thus, according to one embodiment of the invention, relationships may be discovered without considering content of the objects. In an alternative embodiment of the invention, a combination of content-searching and an analysis of parameters derived from information associated with user initiated actions and/or computer initiated actions may be used to discover relationships between objects. By contrast, in the example discussed above, known systems that only rely on content-based searching to discover relationships between objects would not identify that the first object (i.e., an email message) is related to the third object (i.e., a word processing document), if the first object and the third object include different content (e.g., terminology).

Figure 3B:
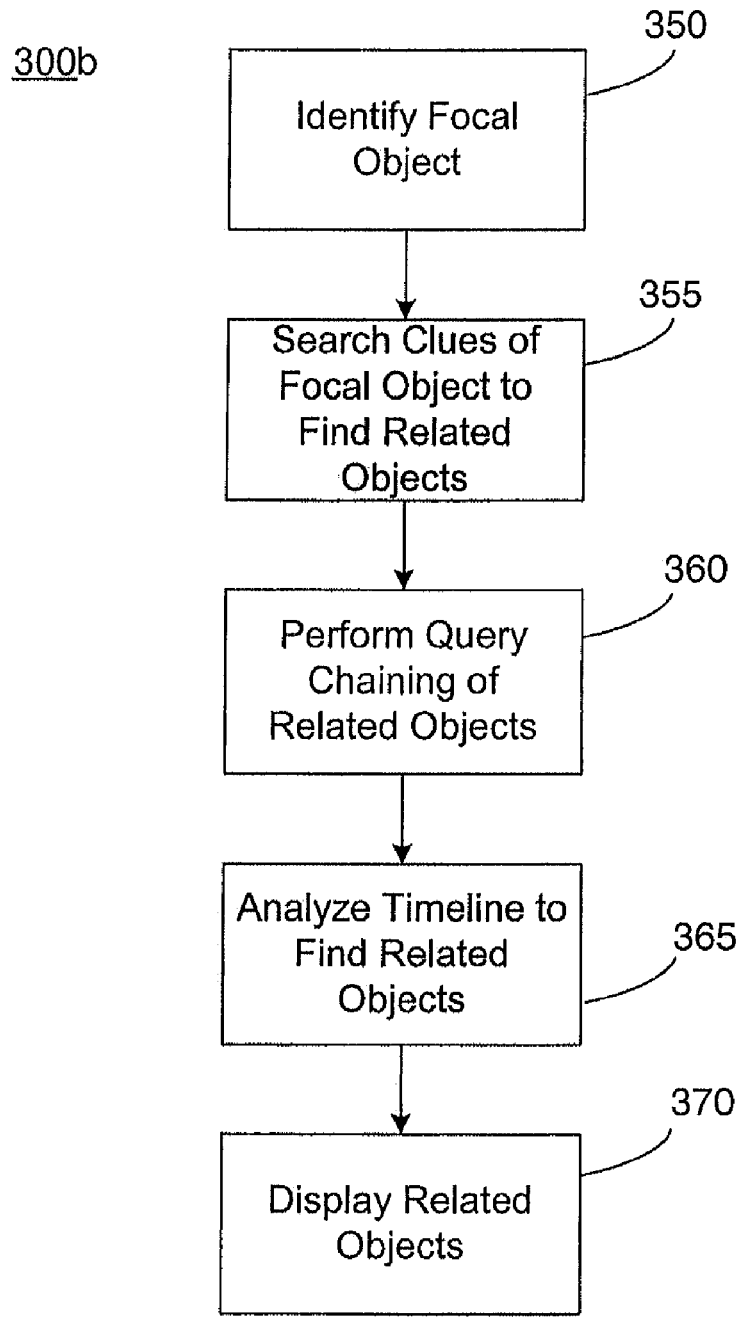
FIG. 3b illustrates a flow chart schematic for performing a search on a focal object according to an embodiment of the invention.

According to another embodiment of the invention, information corresponding to focal object, such as an object with which a user is currently interacting, may be analyzed by related object determining system 136. FIG. 3*b* illustrates flow diagram 300*b* of a generalized method for performing a search on a focal object. In operation 350, a focal object is identified. In operation 355, the system may search clues obtained from the focal object to discover the related objects. The system may also search clues obtained from the related objects to discover additional related objects. A clue may be any information that partially describes a user-interactable object in an application. The clues may be used to find objects that the user is not interacting with, but might be relevant based on the current interactable object.

The system may analyze text extracted from the focal object, meta data of the focal object, the related objects, and/or meta data of the related objects, among other objects. The system may also analyze user action information and other object information. The invention may search on the object information to provide a set of related object search results, which may be displayed on the GUI along with the focal object. The display arrangement of the related objects on the GUI may be based on relevance of the search results, user-defined ordering, chronologically and/or temporally previous user actions, and/or other display arrangement criteria.

According to one embodiment, in operation 360 the system may perform query chaining that includes analyzing the related objects and automatically extracting clues from the related objects to generate additional related objects. The process may be repeated until clues are exhausted or some other threshold is reached. For example, a search on the focal object may return an email message object as a related object. A search on the email message object may return one or more document objects that were included as attachments in the email message object. The email message object may be displayed adjacent to the focal object, while the document objects may be displayed several objects removed from the focal point object.

Timeline information may also be analyzed to find related objects in operation 365. Relationships between objects may be inferred based on analyzing several types of information associated with the objects, including user action information, content of the objects, context in which the object was accessed by the user, and other types of information. A relationship between two or more objects may be inferred through user action associated with the objects, such as the temporal order in which the objects are accessed, whether the user accessed a second object through a first object, whether a first object was opened contemporaneously with a second object, and/or other user actions.

According to another embodiment of the invention, an application may be provided for displaying an information portal on a graphical user interface (GUI) that includes a user selected focal object and several related objects. In operation 370, related objects may be displayed in a GUI together with the selected focal object.

Figure 4:
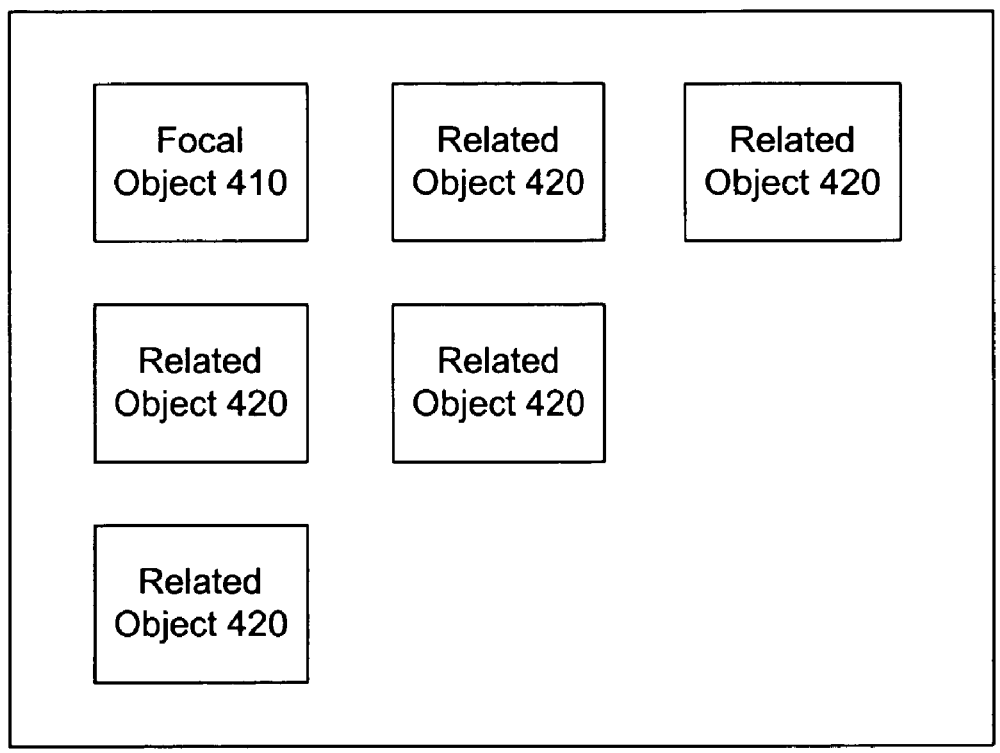
FIG. 4 illustrates an exemplary embodiment of search system according to an embodiment of the invention.

According to one exemplary display arrangement, the information portal may be provided in a window separated from objects currently in use. FIG. 4 depicts information portal 400, in accordance with various embodiments of the invention. The focal object 410 may be displayed in an upper left hand position of the GUI while related objects 420 may be displayed in the remaining locations of the GUI. One of ordinary skill in the art would realize that placement of focal object 410 in an upper left hand position of the GUI is merely exemplary. Other placement may be used, as would be apparent.

Related objects 420 may be displayed such that the most relevant objects are located closest to the focal objects and least relevant objects are located farthest away from the focal object. However, other configurations are contemplated. The information portal may be dynamically generated based on criteria established by the user or other criteria.

Figure 5:
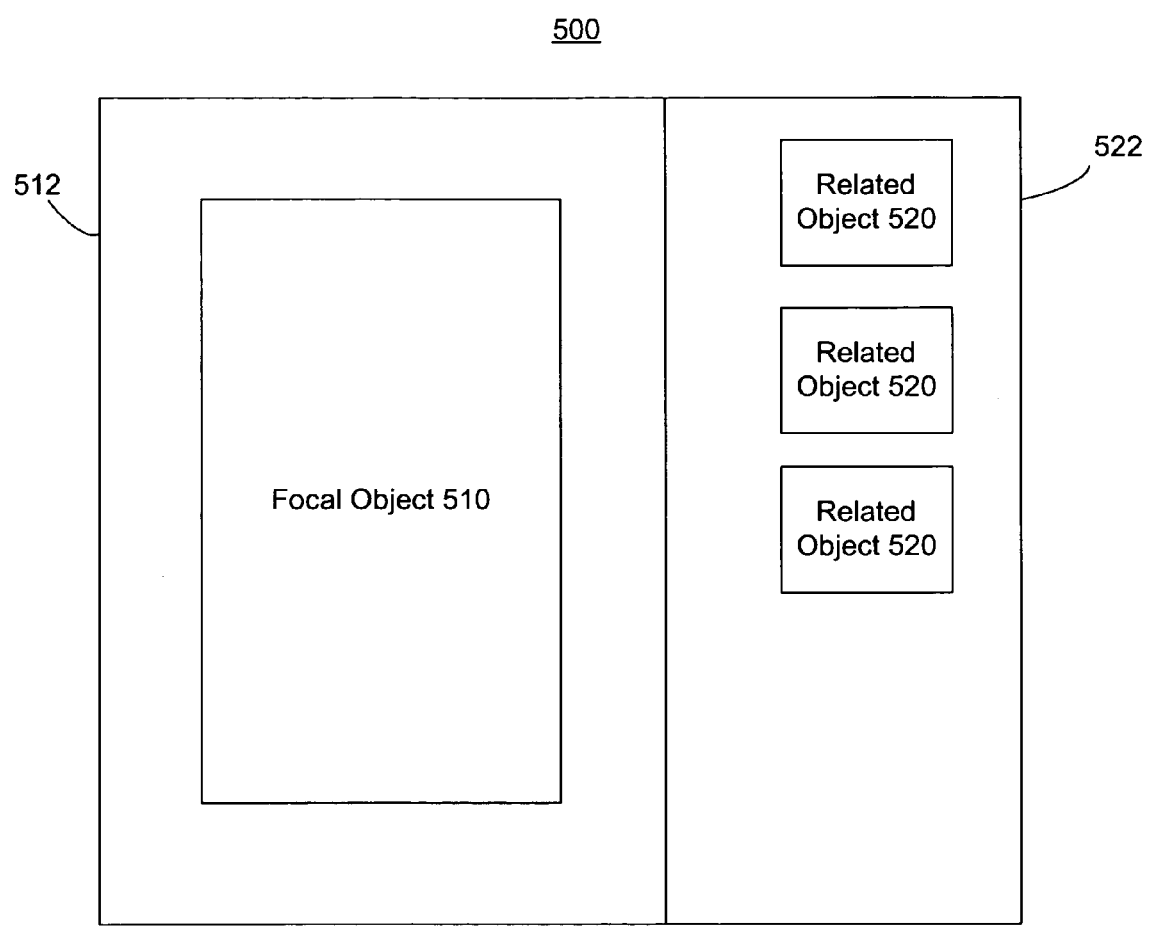
FIG. 5 illustrates a flow chart schematic for performing searches according to an embodiment of the invention.

FIG. 5 depicts another example of an information portal. Information portal 500 may be integrated with an object in use. As illustrated in FIG. 5, the focal object 510 may be presented in a large frame 512 within an object while related objects 520 are displayed in a separate frame 522. Related objects 520 may be presented from top to bottom in order of decreasing relevance. Other methods of displaying related objects may be employed.

The invention enables the user to select a related object that is displayed on the GUI and to designate the selected object as a new focal object. The invention may generate a new GUI that includes the selected object in the position of the focal object. The system may analyze text extracted from the new focal object, user action information, and other focal object information. The system may search on the new focal object information to provide a set of related objects that may be displayed on the GUI along with the new focal object. The display arrangement of the related objects on the GUI may be based on relevance of search results, user-defined ordering, or other display arrangement criteria.

Figure 6:
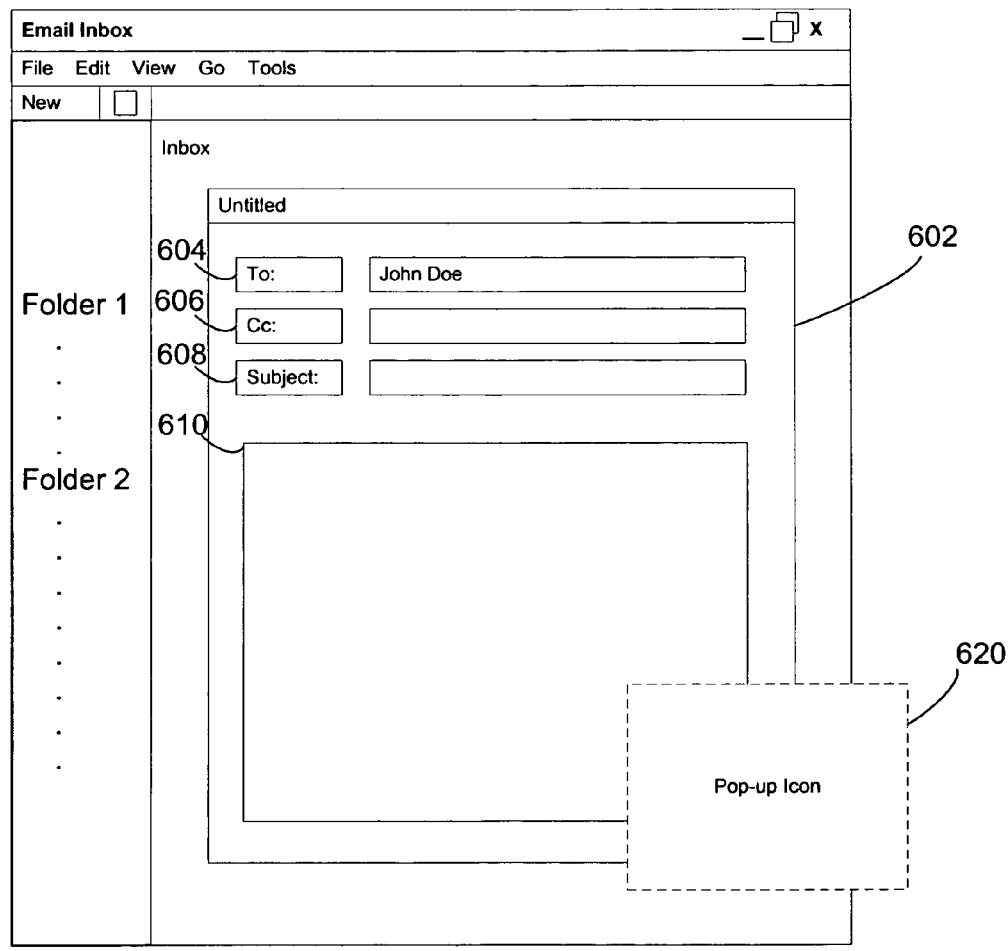
FIG. 6 illustrates a graphical user interface for obtaining search clues from a focal object to discover related objects according to an embodiment of the invention.

FIG. 6 depicts a graphical user interface 600, according to various embodiments of the invention. A user may be working within an application object, such as the email application depicted in FIG. 6. A new email message object 602 may be generated, and this email message object may be considered a focal object. The email message object may include common email message fields such as, for example, a "To" field, a "CC" field, a "Subject" field, and or other fields. Email message object 602 also includes a space for composing the email message.

In accordance with various embodiments of the invention, search clues may be obtained from the focal object to discover related objects. As depicted in FIG. 6, a user has entered the name "John Doe" into the "To" field of email message object 602. A search may then be performed using the gathered timeline information regarding John Doe. Search results may be presented to the user as one or more icons. For example, the user may be presented with popup icon 604. Popup icon 604 may display information such as, for example, an address book entry associated with John Doe, one or more objects created or edited by John Doe, one or more conversations previously held between the user and John Doe, and/or any other information.

According to some embodiments of the invention, characteristics of the icons, such as size, color, shape, location on the GUI, the length of time it is displayed, and/or other characteristics may be used to signify the relevance of the information provided. For example, information most relevant to the focal object may be displayed bright red and on top of the focal object, and may remain for a longer period of time than less relevant information. Additionally, the user may retrieve the object presented in the popup icon by selecting it while it is being displayed.

The invention may generate a graph that visually displays objects and relationships between object, based on user actions, content, context, and other types of information. The graph may include nodes that correspond to objects and/or meta data about the objects, as well as links that represent relationships between objects and/or meta data.

Figure 7:
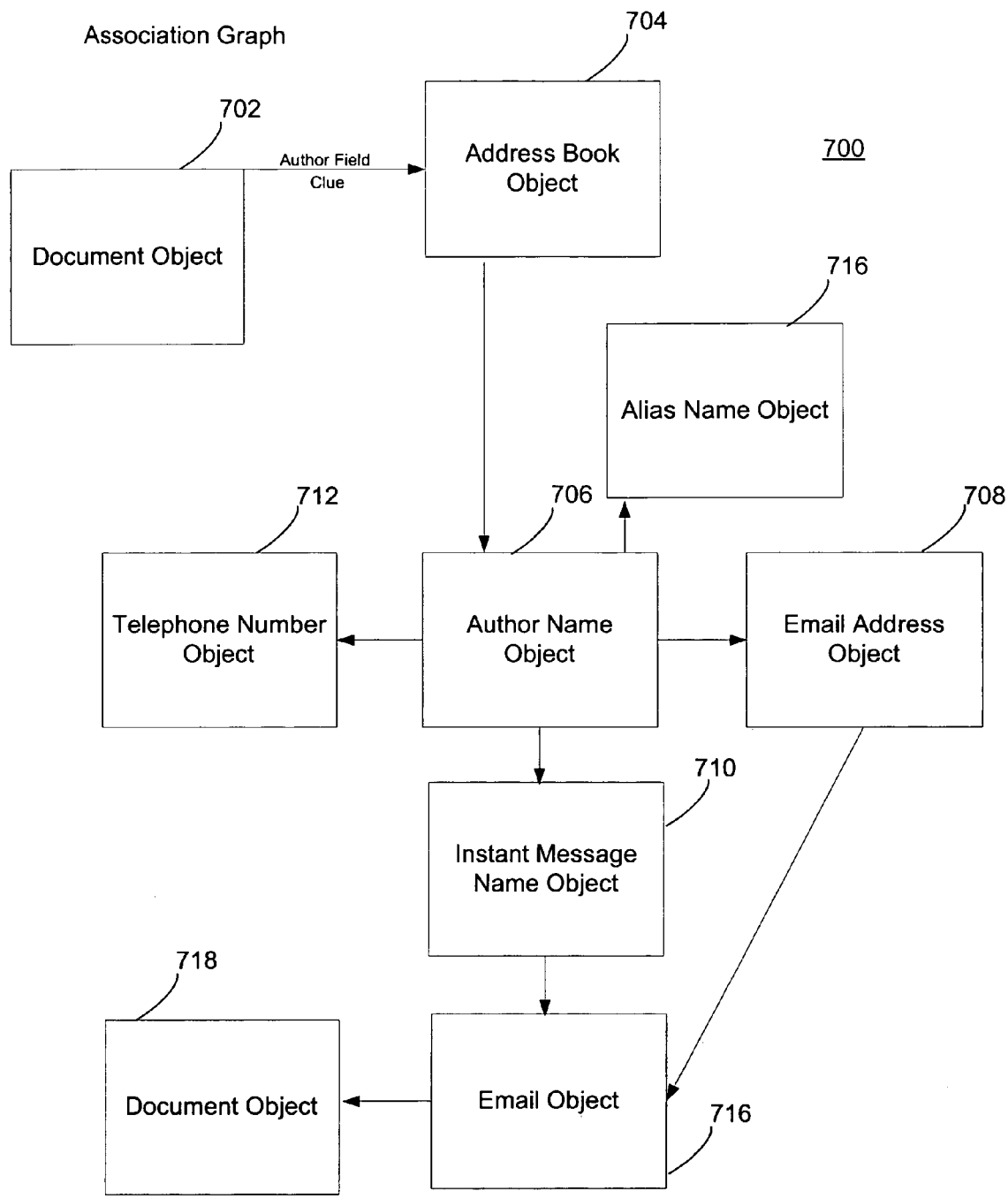
FIG. 7 illustrates a flow chart schematic for generating an association graph that represents objects related to a focal object according to an embodiment of the invention.

FIG. 7 depicts an exemplary process 700 for generating an association graph, according to embodiments of the invention. As depicted at 702, a user may initially submit a search query identifying a particular document object. The search query may be used to obtain objects related to the identified document object. A node may then be created representing the identified object.

Text from the object may be extracted, along with user action information associated with the object. The extracted text may provide one or more clues that may be used to generate additional search results. For example, the extracted text may include an author field, as depicted in FIG. 7. Other clues may be extracted, as would be apparent.

Performing an additional search on the determined clues may result in additional search results. As depicted at 704, a search on the author's name may result in an address book object being discovered. In addition to creating a node for the address book object, nodes may be created for meta data objects associated with the address book object. For example, meta data objects may include author name object 706, email address object 708, instant message name object 710, telephone number object 712, alias name object 714, and/or other objects.

As described above, searches may continue until no further clues are discovered or until a predefined threshold is reached. A search on an email address object may return search results that include email objects that were authored by a user identified in the email address object. Thus, an email object node may be created, as depicted at 716.

A search on user actions associated with the discovered email object may return search results that include document object 718 that are determined to be related based on information that the user accessed the document object through the email object, information that the document object was opened contemporaneously with the email object, and other types of information. The graph may be updated to include all discovered objects. Furthermore, links may be provided between related objects, enabling the user to access an object by selecting the link.

According to one embodiment of the invention, search results may be forwarded to one or more search result recipients. The invention may access a chronological history of user action data and computer action data. The chronological history may include a comprehensive, automated, and continuous timeline of all types of computer actions and user actions relating to the objects. Objects may include applications, documents, files, email messages, chat sessions, web content, and other objects. For example, the user action data may include a user's application level action, a user's activity focus, and other user action information. Relationships between objects may be inferred based on the information obtained from the timeline. Known systems are not able to infer relationships between objects based on user actions and computer actions associated with the objects.

A search may be conducted using user action information and content information to enable the system to present the user with objects that are related through time associations, context associations, or other non-content associations. According to some embodiments of the invention, the forwarded search results may enable the recipient to access the objects indicated in the search results.

According to some embodiments of the invention, a voice recognition system may be provided to enable users to verbally enter search queries. Additionally, the invention may enable voice driven information support systems, such as help lines and other support systems to automatically pull information. Voice driven instant messaging and/or other voice driven applications may also be provided.

As described above, clue packets may be used with content-based searching to automatically provide users with objects that relate to an object the user is currently interacting with. For example, while the user reads email, browsers the web, writes a document, or communicates with friends using an instant messaging program, the system may proactively search for objects that may be relevant to the object currently accessed by the user. The search results may be displayed to the user in an organized manner.

The system may interface to any voice recognition program. The system may be adapted to receive voice commands such as, for example, commands to initiate a search, display search results, retrieve an object presented in a search results display, and/or other voice commands.

According to another embodiment of the invention, clues may be obtained from a digital recording device, such as TiVO, digital radio, and/or other digital recorders. Recorded broadcast objects may be created when viewing a program. The recorded broadcast objects may enable content of the recorded broadcast objects to be searched so that objects related to the content may be presented to the user.

The system may receive objects from a variety of public broadcasting systems, such as, for example, television, radio, and/or other public broadcasting systems. While a user is watching television or listening to digital radio, the digital recorder may record the broadcast and provide the recorded broadcast to a search engine as described herein. A search may be performed using the Internet or other online resources. The search engine may search for clues and provide the user with objects that may be relevant to the recorded broadcast. For example, if the user is watching a movie, the user may be presented with people objects for each of the actors, directors, or other people associated with the movie. The user may also be provided with music objects that list music title, albums, and artists associated with the movie. Other object types may be displayed to the user.

According to some embodiments of the invention, the related objects may be displayed or broadcast to the user while watching the television program or listening to the radio. In other embodiments, the digital recorder may be equipped with communications means for transmitting the search results to an email address, or other messaging device associated with the user. The user may then review the related objects at a later time.

The foregoing presentation of the described embodiments is provided to enable any person skilled in the art to make or use the invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, as a firmware program loaded into non-volatile storage or a software program loaded from or into a data storage medium as machine-readable code, such code being instructions executable by an array of logic elements such as a microprocessor or other digital signal processing unit, or may include other implementations.

Embodiments of the invention include a computer program containing one or more sequences of machine-readable instructions describing a method as disclosed above, or a data storage medium (e.g. semiconductor memory, magnetic or optical disk) having such a computer program stored therein.

The invention is not intended to be limited to the embodiments provided above, but rather is to be accorded the widest scope consistent with the principles and novel features disclosed in any fashion herein. The scope of the invention is to be determined solely by the appended claims.

What is claimed is:

1. A method of performing a search, comprising:
receiving a broadcast object from a broadcast media source;
in response to the receipt of the broadcast object, automatically and without user intervention, a microprocessor sequentially executes steps comprising:
i) extracting focal information from the broadcast object;
ii) performing a search on the focal information to obtain one or more related objects which are related to the broadcast object;
iii) extracting related information from the one or more related objects;
iv) performing a search on the related information to obtain one or more additional related objects; and
v) displaying, via a graphical user interface, the one or more related objects and the one or more additional related objects.

2. The method of claim 1, wherein the broadcast media source is a digital radio source.

3. The method of claim 1, wherein the broadcast media source is a television source.

4. The method of claim 1, wherein the search is a web-based search.

5. The method of claim 1, wherein the broadcast object is associated with a broadcast program being viewed or listened to by a user.

6. The method of claim 5, wherein the steps i) to iv) are performed while the broadcast program is being viewed or listened to by the user.

7. The method of claim 1, further comprising transmitting the one or more related objects and the one or more additional related objects to a user's email address.

8. The method of claim 1, further comprising transmitting the one or more related objects and the one or more additional related objects to a user's messaging device.

9. A system for performing a search, comprising:
a microprocessor-based related object determining system that in response to receiving a broadcast object from a broadcast media source, automatically and without user intervention, sequentially:
i) extracts focal information from the broadcast object;
ii) performs a search on the focal information to obtain one or more related objects related to the broadcast object;
iii) extracts related information from the one or more related objects;
iv) performs a search on the related information to obtain one or more additional related objects; and
a graphical user interface that in response to receiving a broadcast object from a broadcast media source, automatically and without user intervention:
displays the one or more related objects and the one or more additional related objects.

10. The system of claim 9, wherein the broadcast media source is a digital radio source.

11. The system of claim 9, wherein the broadcast media source is a television source.

12. The system of claim 9, wherein the search is a web-based search.

13. The system of claim 9, wherein the broadcast object is associated with a broadcast program being viewed or listened to by a user.

14. The system of claim 13, wherein the related object determining system performs operations i) to iv) while the broadcast program is being viewed or listened to by the user.

15. The system of claim 9, further comprising communication means for transmitting the one or more related objects and the one or more additional related objects to a user's email address.

16. The system of claim 9, further comprising communication means for transmitting the one or more related objects and the one or more additional related objects to a user's messaging device.

17. The method of claim 5, further comprising broadcasting the one or more related objects and the one or more additional related objects while the broadcast program is being viewed or listened to by the user.

18. The method of claim 5, wherein the broadcast object is a recorded broadcast object that is recorded by a digital recording device while the broadcast program is being viewed or listened to by the user.

19. The method of claim 1, wherein the broadcast object is a movie object and performing a search on the focal information further comprises performing a search on the focal information associated with the movie object to obtain one or more related people objects or one or more related music objects which are related to the movie object.

20. The method of claim 5, wherein displaying, via the graphical user interface, further comprises displaying the broadcast object, the one or more related objects, and the one or more additional related objects while the broadcast program is being viewed or listened to by the user.

* * * * *